Figure 1:
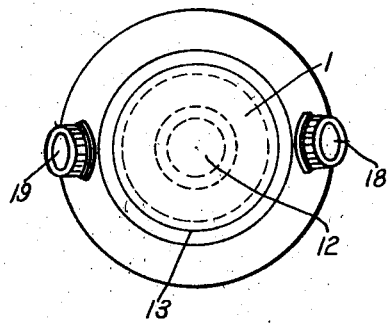

Mar. 3, 1925.

C. J. RODMAN ET AL 1,528,076

STANDARD CELL

Filed April 25, 1921

WITNESSES:
A.G. Schiefelbein.
H.C. Bierman

INVENTORS
Clarence J. Rodman
Thomas Spooner.
BY
Wesley G. Carr
ATTORNEY

Patented Mar. 3, 1925.

1,528,076

UNITED STATES PATENT OFFICE.

CLARENCE J. RODMAN, OF WILKINSBURG, AND THOMAS SPOONER, OF EDGEWOOD PARK, PENNSYLVANIA, ASSIGNORS TO WESTINGHOUSE ELECTRIC & MANUFACTURING COMPANY, A CORPORATION OF PENNSYLVANIA.

STANDARD CELL.

Application filed April 25, 1921. Serial No. 464,317.

*To all whom it may concern:*

Be it known that we, CLARENCE J. RODMAN, a citizen of the United States, and a resident of Wilkinsburg, in the county of Allegheny and State of Pennsylvania, and THOMAS SPOONER, a citizen of the United States, and a resident of Edgewood Park, in the county of Allegheny and State of Pennsylvania, have invented a new and useful Improvement in Standard Cells, of which the following is a specification.

This invention relates to primary cells, more especially to standard cells for various purposes.

Standard cells are essential elements in various types of apparatus. They are used to a large extent in potentiometers which are employed for measuring voltages very accurately, and practically all high grade instruments include a standard cell as a unit of reference for voltage. Practically all voltmeters, ammeters, and the like are calibrated by potentiometers, and frequently standard instruments are dispensed with, potentiometers being used to calibrate the various instruments.

Standard cells find a very considerable use in thermo-couple indicators operating upon the potentiometer principle. A similar arrangement is utilized to a great extent in wireless apparatus, particularly where vacuum tubes are a part of the sending or receiving system. In this case, the standard cell is utilized to adjust the voltage of the grid element of the three-electrode vacuum tube of the wireless system.

Hitherto, practically all standard cells consisted of cadmium and mercury electrodes with mercurous sulphate and cadmium sulphate as electrolyte. These materials were placed in the legs of an H-shaped receptacle, the horizontal section thereof providing communication between the two electrode chambers, the upper portions of the vertical legs being sealed off.

Due to this construction the cell was fragile, it could not withstand severe service, and the dependability of the cell was lessened since temperature changes caused varying changes in voltage. In this type of cell, the leads were generally of platinum fused into the glass, which was generally soda glass. Due to the widely differing coefficients of expansion of the materials, the cells very often cracked and leaked at the joints even though the glass was well annealed.

The present invention is designed to obviate the disadvantages inherent in the old type of standard cell, it being among the objects thereof to provide a cell which is compact, in which temperature changes do not cause corresponding changes in voltage of the cell, in which there is no tendency for the sealed-in portions to crack, which is comparatively simple in construction, easy to handle and thoroughly reliable.

In practising our invention, we provide a central cylindrical chamber, of impervious material, which constitutes the cathode chamber of the cell and form integrally therewith a concentric outer chamber, also of impervious material, communicating with the inner chamber and constituting the anode chamber.

We further provide novel means for securing the electrodes in the cell, and for filling the same with the ingredients thereof and sealing from the atmosphere.

Figure 2:
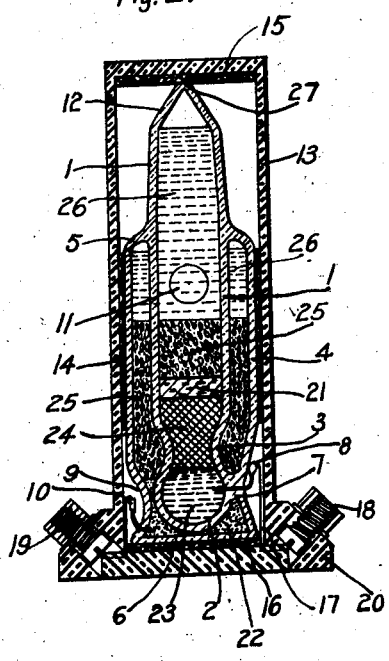

In the accompanying drawings forming a part hereof and which illustrate a single embodiment of our invention, Fig. 1 is a plan view of a cell constructed in accordance with our invention, and Fig. 2 a vertical sectional view thereof.

The cell comprises a cylindrical tube or chamber 1 preferably of a high silica glass which is highly insoluble under the slightly acid conditions prevailing in the cell. The bottom portion 2 thereof is closed and is spherical in shape, a constricted portion 3 being formed at the junction of said spherical portion with the body of the tube. The tube 1 constitutes the cathode chamber of the cell.

An outer cylindrical chamber 4, also of high silica glass, is fused to the tube 1 near its upper portion, as shown at 5, and the bottom 6 thereof, which is closed and which surrounds the spherical portion 2, is flattened so that the cell may stand on a level surface. In the side of said outer concentric chamber 4 is formed a depression 7, the material of the inner and outer chambers being fused together at that point, and a tungsten electrode 8 is inserted into the spherical portion 2. A similar depression 9 is formed on the opposite side of chamber 4 and a tungsten electrode 10 is sealed into the lower part of the outer chamber at that point. Since the silica glass and the tungsten electrodes have approximately the same coefficients of expansion, there is no tendency for cracking of the glass due to temperature changes, thus avoiding leakage in the cell.

An opening 11 is formed in the inner chamber 1 near the top thereof and communicates with the outer chamber 4. The upper portion 12 of chamber 1 is sealed off. The completed cell is secured in a casing 13 of any suitable material, generally a molded material, such as bakelite. A cylindrical washer 14, generally of felt, is interposed between the sides of the casing 13 and the walls of chamber 4 and similar felt washers 15 and 16 are placed between the top and bottom of the cell, respectively, and the corresponding walls of the casing.

Electrode 8 is secured to a suitable wire 17, such as of copper, which makes metallic connection with binding post 18. In a similar manner, electrode 10 is electrically connected to binding post 19, both of said binding posts being molded in the base 20 of the casing 13.

The cell is formed initially, as shown in the drawings, the portion 12 thereof being open. Cadmium amalgam 22, usually containing 12.5% by weight of cadmium, is placed in the bottom of the outer chamber 4 by means of a bent tube which is inserted through the chamber 1 and opening 11, establishing communication with the outer chamber 4. Mercury 23 is placed in spherical portion 2 and a paste 24 consisting of mercurous sulphate and cadmium sulphate placed thereover.

A cork 21, generally covered with acid treated silk, is inserted into chamber 1 in such manner that it holds the mercury and mercurous paste in position, the cork being slightly compressed and wedged in place by the walls of the chamber. If desired, instead of a cork plug, one formed of a silk covered coil of tungsten wire may be used. Cadmium sulphate crystals 25 are then placed in both the inner and outer chambers and the remaining space is filled by a saturated solution 26 of cadmium sulphate. The top 12 of the cell is then sealed off, as shown at 27.

Cells constructed in accordance with our invention have been found to be very reliable in service and but very slightly affected by atmospheric conditions. The cell is small and compact and is readily portable. The two legs forming the cathode and anode chambers are practically always at the same temperature, thus reducing variations in voltage due to temperature changes. The cell is stable over long periods of time and the electromotive force produced is very constant.

Although we have described in detail the construction of our new cell, it is to be understood that our invention is not limited to the details set forth. It will be apparent to those skilled in the art that various changes in construction and arrangement of parts may be made within the scope of our invention. For instance, the central chamber, instead of being made the cathode, may be made the anode, various forms of sealing devices other than those described may be utilized in the cell itself, and different ingredients may be used in filling the same. The term "concentric" as used in the claims is not limited to the chambers being so formed that their axes coincide. The term is used in a broader sense and includes a structure having one chamber placed within the other whether or not their axes coincide.

We claim as our invention:

1. A cell comprising a plurality of chambers concentrically arranged, chemically active solids in said chambers, an impervious non-perforate wall separating said solids and electrodes secured in said chambers.

2. A cell comprising a plurality of chambers concentrically arranged, chemically active solids in said chambers, walls of non-perforate impervious material separating said solids, the inner of said chambers constituting the cathode chamber and the outer the anode chamber and electrodes secured in said chambers.

3. A cell comprising a plurality of chambers concentrically arranged and integrally secured together and electrodes in said chambers.

4. A cell comprising a plurality of chambers concentrically arranged and integrally secured together, a non-perforate wall of impervious material separating said chambers, electrodes in said chambers and a passageway between the upper parts thereof.

5. A cell comprising a cylindrical chamber, a constricted portion in the lower end thereof forming a spherical end, an outer concentric chamber, a passageway between the upper parts of said chambers, and electrodes in the lower parts thereof.

6. A cell comprising a cylindrical chamber, a constricted portion in the lower end thereof forming a spherical end, an outer concentric chamber having depressed portions, a passageway between the upper parts of said chambers, and electrodes in said depressions, said electrodes extending into said chambers, respectively.

7. A cell comprising a plurality of chambers concentrically arranged, the inner of said chambers constituting the cathode chamber and the outer the anode, mercury in said cathode chamber, cadmium amalgam in said anode chamber, mercury cadmium paste above said mercury, means for holding said paste in position, cadmium sulphate crystals in both of said chambers and cadmium sulphate solution substantially filling said cell.

8. A cell comprising a plurality of chambers concentrically arranged, the inner of said chambers constituting the cathode chamber and the outer the anode, mercury in said cathode chamber, cadmium amalgam in said anode chamber, mercury cadmium paste above said mercury, a silk-covered cork wedged in said inner chamber holding said paste in position, cadmium sulphate crystals in both of said chambers and cadmium sulphate solution substantially filling said cell.

9. A cell comprising a cylindrical chamber, a constricted portion in the lower end thereof forming a spherical end, mercury therein, an outer concentric chamber, cadmium amalgam therein, a passageway between the upper parts of said chambers, electrodes in the lower portions thereof and electrolytes in both of said chambers.

In testimony whereof, we have hereunto subscribed our names this 11th day of April, 1921.

CLARENCE J. RODMAN.
THOMAS SPOONER.

Certificate of Correction.

It is hereby certified that in Letters Patent No. 1,528,076, granted March 3, 1925, upon the application of Clarence J. Rodman, of Wilkinsburg, and Thomas Spooner, of Edgewood Park, Pennsylvania, for an improvement in "Standard Cells," an error appears in the printed specification requiring correction as follows: Page 2, line 104, claim 3, after the word "together" insert the words *a non-perforate wall of impervious material separating said chambers;* and that the said Letters Patent should be read with this correction therein that the same may conform to the record of the case in the Patent Office.

Signed and sealed this 7th day of April, A. D. 1925.

[SEAL.]
KARL FENNING,
*Acting Commissioner of Patents.*